(12) United States Patent
Chiba et al.

(10) Patent No.: US 7,534,750 B2
(45) Date of Patent: May 19, 2009

(54) COMPOSITION, MAGNETIC RECORDING MEDIUM, HEAD SLIDER, AND MAGNETIC RECORDING DEVICE

(75) Inventors: Hiroshi Chiba, Kawasaki (JP); Yukiko Oshikubo, Kawasaki (JP); Keiji Watanabe, Kawasaki (JP); Eishin Yamakawa, Higashine (JP); Takeshi Toukairin, Higashine (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 11/063,737

(22) Filed: Feb. 24, 2005

(65) Prior Publication Data

US 2006/0106260 A1 May 18, 2006

(30) Foreign Application Priority Data

Nov. 15, 2004 (JP) ............................. 2004-330501

(51) Int. Cl.
*C10M 169/04* (2006.01)
(52) U.S. Cl. .................................... 508/582; 428/835.7
(58) Field of Classification Search ................. 428/834; 508/582; 568/615
See application file for complete search history.

(56) References Cited

U.S. PATENT DOCUMENTS 6,316,062 B1 * 11/2001 Sakaguchi et al. .......... 427/570
6,468,602 B2 * 10/2002 Sakaguchi et al. .......... 427/570
7,105,241 B2 * 9/2006 Shimokawa et al. ..... 428/835.8
7,115,783 B2 * 10/2006 Marchionni et al. ......... 568/615
7,230,140 B2 * 6/2007 Shirakawa et al. .......... 568/615
2006/0106260 A1 * 5/2006 Chiba et al. ................ 568/677

FOREIGN PATENT DOCUMENTS

JP 9-282642 10/1997
JP 10-143838 5/1998

* cited by examiner

*Primary Examiner*—Holly Rickman
*Assistant Examiner*—Gary D Harris
(74) *Attorney, Agent, or Firm*—Westerman, Hattori, Daniels & Adrian, LLP.

(57) ABSTRACT

There are provided a composition that exhibits sufficient flowability and also displays high substrate adhesion, and a magnetic recording medium, a head slider and a magnetic recording device that use this composition as a lubricant and are thus not prone to faults. The composition comprises a fluorine-containing polyether represented by formula (1), $$HOCH_2CHCH_2OCH_2CF_2O(CF_2CF_2O)_p(CF_2O)_qCF_2CH_2OH \quad (1)$$
$$|$$
$$OH$$

(in formula (1), p and q represent, independently of the symbols in other formulae, any chosen integers). The composition can be produced by reacting a polymer represented by formula (2) with glycidol, $$HOCH_2CF_2O(CF_2CF_2O)_p(CF_2O)_qCF_2CH_2OH \quad (2)$$

(in formula (2), p and q represent, independently of the symbols in other formulae, any chosen integers).

9 Claims, 3 Drawing Sheets

COMPOSITION, MAGNETIC RECORDING MEDIUM, HEAD SLIDER, AND MAGNETIC RECORDING DEVICE

CROSS-REFERENCE TO RELATED APPLICATIONS

This application is based upon and claims the benefit of priority from the prior Japanese Patent Application No. 2004-330501, filed on Nov. 15, 2004, the entire contents of which are incorporated herein by reference.

BACKGROUND OF THE INVENTION

1. Field of the Invention

The present invention relates to a lubricant for a magnetic recording device.

2. Description of the Related Art

In a magnetic recording device, reading and writing of information is carried out while a head slider having a magnetic recording transducer (in the present invention, also referred to simply as a 'head') flies over a hard disk which is a magnetic recording medium.

The distance between the head and a magnetic layer for recording (writing) or reproducing (reading) magnetic information on the hard disk is known as the magnetic spacing; the smaller the magnetic spacing, the greater the recording density. Meanwhile, to increase the information transfer rate, the rotational speed of the hard disk must be made high. In recent years, as the recording density and the transfer rate have been increased, there has been progress in reducing the flying height (also called floating height) and increasing in the rotational speed; currently, the head flying height has become approximately 10 nm, and the rotational speed has become approximately 15,000 rpm.

With a hard disk drive, to increase the reliability of the drive, a lubricant is applied, in a thickness of approximately 1 to 2 nm, onto the magnetic disk or the head slider, in general. This lubricant reduces friction and wear upon contact of the head with the disk, preventing the occurrence of faults.

The film thickness of the lubricant accounts for approximately 10% of the head flying height, and hence it cannot be disregarded as a factor for the magnetic spacing. Consequently, as the flying height has been reduced and the rotational speed has been increased in recent years, the properties required of the lubricant have become stricter, so that it has become almost impossible for a single component to satisfy the desired properties. There have thus been proposals to use a lubricant comprising, for example, a mixture of two lubricants (see, for example, Japanese Unexamined Patent Application Publication No. 10-143838 (claims), and No. 9-282642 (claims)). It aims at achieving both good substrate adhesion (adhesion to a substrate) and good flowability for the lubricant, by using a mixture of a low-viscosity lubricant and a high-substrate-adhesion lubricant (a lubricant with high adhesion to the substrate).

When the substrate adhesions of the two lubricants are compared, in the case of Japanese Unexamined Patent Application Publication No. 10-143838 for example, the adhesion of FOMBLIN Z TETRAOL (made by Solvay Solexis, molecular weight 2040) represented by formula (6) is markedly higher than that of FOMBLIN Z DOL (made by Solvay Solexis, molecular weight 2020) represented by formula (2). If these are mixed together and the mixture is applied onto a magnetic disk, then the flowability is increased due to the presence of the FOMBLIN Z DOL, and hence the desired film formation ability is realized. However, it has been found that, upon fast rotation, the polymer represented by formula (2) flies off and thus the amount thereof drops, whereby the proportion of the polymer represented by formula (6) increases, bringing about faulty flying.

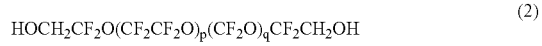

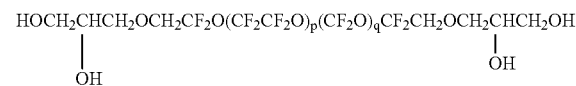

SUMMARY OF THE INVENTION

It is an object of the present invention to resolve the above problem, and provide a composition that exhibits sufficient flowability and also displays high substrate adhesion, and a magnetic recording medium, a head slider and a magnetic recording device using this composition. Other objects and advantages of the present invention will be apparent from the following detailed description.

According to an aspect of the present invention, there is provided a composition comprising a fluorine-containing polyether represented by formula (1),

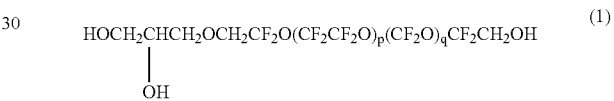

(in formula (1), p and q represent, independently of the symbols in other formulae, any chosen integers.)

It is preferable for the composition to have a number average molecular weight in a range of 500 to 5,000, and for the ratio A:B of the number of mols A of the terminal group represented by formula (3) to the number of mols B of the terminal group represented by formula (4) in the composition as measured by $^{19}$F NMR to be in a range of 10:90 to 95:5.

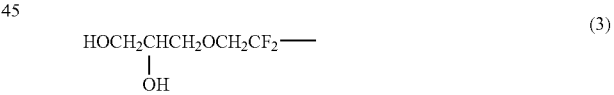

According to another aspect of the present invention, there is provided a composition comprising a polymer obtained by reacting a polymer represented by formula (2) with glycidol, wherein the number average molecular weight of the composition is in a range of 500 to 5,000, and the ratio A:B of the number of mols A of the terminal group represented by formula (3) to the number of mols B of the terminal group represented by formula (4) in the composition as measured by $^{19}$F NMR is in a range of 10:90 to 95:5.

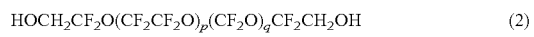

(in formula (2), p and q represent, independently of the symbols in other formulae, any chosen integers.)

This composition preferably comprises a fluorine-containing polyether represented by formula (1) Furthermore, with either of the above compositions, it is preferable for the composition to comprise a polymer represented by formula (2), for the composition to comprise a polymer represented by formula (6)

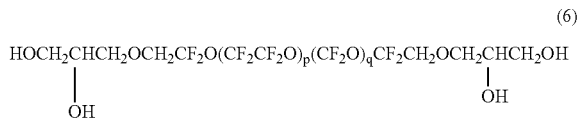

(6)

(in formula (6), p and q represent, independently of the symbols in other formulae, any chosen integers), for the ratio of the number of mols C of the fluorine-containing polyether to the sum of the number of mols C of the fluorine-containing polyether and the number of mols D of the polymer represented by formula (2) to be not less than 10%, for the ratio of the number of mols C of the fluorine-containing polyether to the sum of the number of mols C of the fluorine-containing polyether and the number of mols E of the polymer represented by formula (6) to be not less than 10%, particularly preferably not less than 60%, and for the ratio of the number of mols C of the fluorine-containing polyether to the sum of the number of mols C of the fluorine-containing polyether, the number of mols D of the polymer represented by formula (2) and the number of mols E of the polymer represented by formula (6) to be not less than 10%.

According to the above aspects of the present invention, there can be obtained a composition that exhibits sufficient flowability and also displays high substrate adhesion.

According to yet other aspects of the present invention, there are provided: a magnetic recording medium comprising a magnetic layer, a protective layer on the magnetic layer, and a magnetic recording medium lubricant layer on the protective layer, wherein the magnetic recording medium lubricant layer is obtained by applying a composition as described above; a head slider having a magnetic recording transducer for carrying out at least one of recording and reproduction of information on a magnetic recording medium, the head slider having a head slider lubricant layer obtained by applying a composition as described above onto a head slider surface facing the magnetic recording medium; and a magnetic recording device using at least one of the above magnetic recording medium and the above head slider.

For the above magnetic recording medium and the above head slider, it is preferable to carry out at least one of active energy ray treatment and heating treatment after the application of the lubricant.

According to the above aspects of the present invention, there can be obtained a magnetic recording medium, a head slider and a magnetic recording device that are not prone to faults.

According to yet another aspect of the present invention, there is provided a composition obtained by subjecting a composition as described above to at least one of active energy ray treatment and heating treatment.

According to yet other aspects of the present invention, there are provided: a magnetic recording medium comprising a magnetic layer, a protective layer on the magnetic layer, and a magnetic recording medium lubricant layer on the protective layer, wherein the magnetic recording medium lubricant layer comprises the above treated composition; a head slider having a magnetic recording transducer for carrying out at least one of recording and reproduction of information on a magnetic recording medium, the head slider having a head slider lubricant layer comprising the above treated composition on a head slider surface facing the magnetic recording medium; and a magnetic recording device using at least one of the above magnetic recording medium and the above head slider. According to these aspects of the present invention, the same effects as those described above can be obtained.

As a whole, according to the present invention, there can be obtained a composition that exhibits sufficient flowability and also displays high substrate adhesion, and a magnetic recording medium, a head slider and a magnetic recording device that use this composition as a lubricant and are thus not prone to faults.

DESCRIPTION OF THE PREFERRED EMBODIMENTS

Following is a description of embodiments of the present invention through drawings, formulae, examples and so on. Note that these drawings, formulae, examples and so on, and the description merely illustrate the present invention, and do not limit the scope of the present invention. It goes without saying that the other embodiments can also come under the category of the present invention as long as the gist of the present invention is conformed to. In each of the formulae relating to the present invention, p and q represent any chosen integers, independent of p and q in the other formulae.

Note also that, in the following, the present invention is mainly described with regard to a hard disk drive; however, the 'head slider' according to the present invention is not limited to one for a hard disk drive such as one operating with the loading-unloading mechanism, one operating with the contact-start-stop mechanism, one with which information is recorded and reproduced by the complete floating method, one with which information is recorded and reproduced by the gas-liquid mixing method, and one with which information is recorded and reproduced by the contact method, but rather all types of head sliders are included. Furthermore, the 'magnetic recording medium' according to the present invention may be any kind of recording medium, including a longitudinal recording medium, an SFM (Synthetic Ferrimagnetic Medium or Antiferromagnetically Coupled Medium), a vertical recording medium, and a patterned medium used for hard disk devices. In addition, the 'magnetic recording device' according to the present invention includes all magnetic recording devices that use such a head slider and/or magnetic recording medium.

Figure 2:
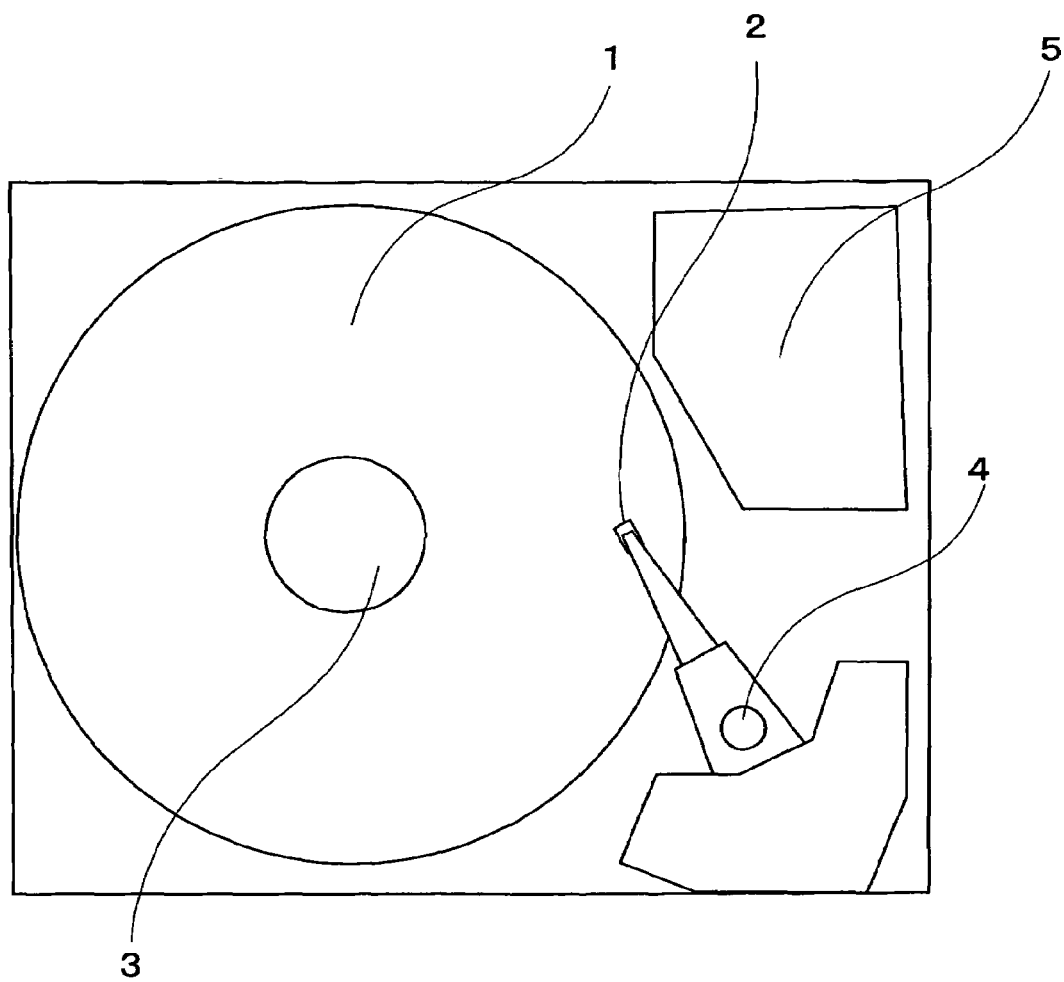
FIG. 2 is a schematic plan view showing the internal structure of a hard disk drive.
Figure 3:
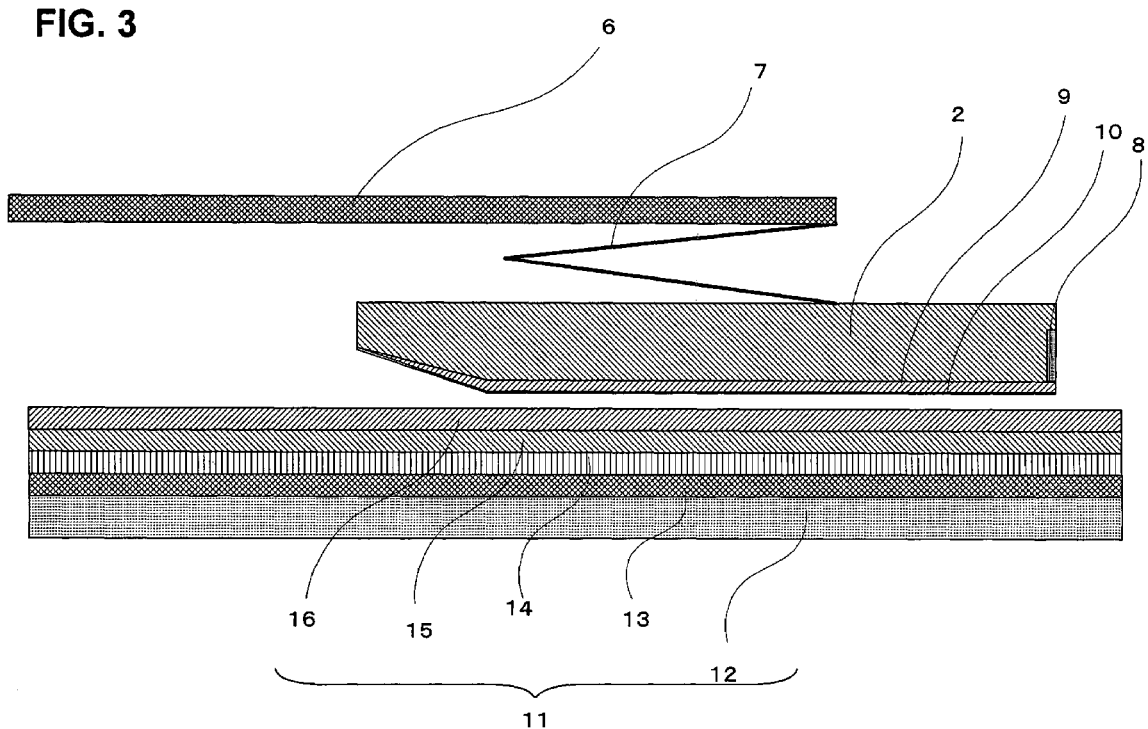
FIG. 3 is a schematic side cross-sectional view showing the relationship between a head and a magnetic recording medium.

Such a device is shown in FIGS. 2 and 3. FIG. 2 is a schematic plan view showing the internal structure of a hard disk drive, and FIG. 3 is a schematic side cross-sectional view (a view of a cross-section in a direction perpendicular to the magnetic layer of the magnetic recording medium) showing the relationship between a head (magnetic recording transducer) and a magnetic recording medium.

As shown in FIG. 2, this hard disk drive has, as main components, a magnetic recording medium 1, a head slider 2 having a head, a rotation control mechanism 3 (e.g. a spindle motor) for the magnetic recording medium 1, a head positioning mechanism 4, and recording/reproduction signal processing circuit 5 (a read/write amplifier or the like).

As shown in FIG. 3, the head slider 2 is connected to the head positioning mechanism 4 by a suspension 6 and gimbals 7 for flexibly supporting the head slider 2, and a head 8 is provided at the tip of the head slider 2. A head protective layer 9 and a head lubricant layer 10 are provided on the surface of the head slider.

The magnetic recording medium 11 has, from the bottom in FIG. 3, a substrate 12, a Cr underlayer 13, a magnetic layer 14, a medium protective layer 15, a medium lubricant layer 16 and so on. Other layers such as a seed layer may be provided, but these are omitted from the drawings. In the case of a hard disk, the thicknesses of the layers are generally approximately 1 to 2 nm for the medium lubricant layer, approximately 3 to 5 nm for the medium protective layer, approximately 20 nm for the magnetic layer, and approximately 10 nm for the Cr underlayer.

A composition according to the present invention comprises a fluorine-containing polyether represented by formula (1).

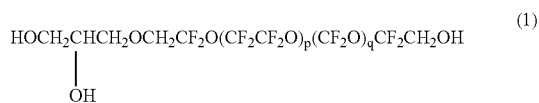

Note that the composition according to the present invention may be used as a so-called lubricant in any application as long as it is an application in which the surface of an object to be protected is coated and hence given lubricity, thus preventing the surface of the object from being damaged. It can be particularly preferably used for a lubricant layer of a magnetic recording medium and/or head slider in a magnetic recording device.

In the following, the composition according to the present invention is mainly described as one consisting only of a polymer or polymers according to the present invention; however, the composition may also comprise lubricant components other than polymers according to the present invention, and may also comprise other organic substances as solvents.

If a magnetic disk to which a conventional composition comprising a mixture of a polymer represented by formula (6) and a polymer represented by formula (2) has been applied as a lubricant is rotated at high speed, then because the polymer represented by formula (2) has weak substrate adhesion, the polymer represented by formula (2) flies off. However, with the present invention, such a problem can be overcome, and when the composition according to the present invention is used for a lubricant layer of a magnetic recording medium and/or head slider in a magnetic recording device, sufficient flowability is exhibited, and high substrate adhesion is also displayed.

With a magnetic disk to which a conventional composition comprising a mixture of a polymer represented by formula (6) and a polymer represented by formula (2) is applied as a lubricant, it is thought that sufficient substrate adhesion is not obtained because not only does the polymer represented by formula (2) have weak substrate adhesion but also they are present as independent molecules.

In contrast with this, with the present invention, by making a single polymer have the terminal group of a polymer represented by formula (2) ($-CF_2CH_2OH$) and the terminal group of a polymer represented by formula (6) ($-CF_2CH_2OCH_2CH(OH)CH_2OH$), the flowability of a polymer represented by formula (2) and the high substrate adhesion of a polymer represented by formula (6) can be attained simultaneously.

It is preferable for the above composition to have a number average molecular weight in a range of 500 to 5,000, and for the ratio A:B of the number of mols A of the terminal group represented by formula (3) to the number of mols B of the terminal group represented by formula (4) as measured by $^{19}F$ NMR to be in a range of 10:90 to 95:5. If the number average molecular weight is less than 500, then in the case, for example, of applying onto a magnetic disk, the amount that flies off upon rotating at high speed will be prone to increasing. If the number average molecular weight exceeds 5,000, then the flowability as a lubricant will be prone to being insufficient. Furthermore, if the proportion of A is high, then the substrate adhesion can be increased, but if this proportion of A is too high so as to deviate from the above range, then although the substrate adhesion will be high, the flowability as a lubricant will be prone to being insufficient. If the proportion of B is high, then the flowability can be increased, but if this proportion of B is too high so as to deviate from the above range, then although the flowability as a lubricant will be high, the substrate adhesion will be prone to being insufficient.

Note that if the above composition consists of the fluorine-containing polyether represented by formula (1) alone, then the number average molecular weight may be determined as the number average molecular weight of the fluorine-containing polyether represented by formula (1), but in the case that the composition also comprises other lubricants, the number average molecular weight is determined for the total of the fluorine-containing polyether represented by formula (1) and the other lubricants, treating these as if they were one polymer. In the case that a solvent is present, the number average molecular weight is determined after removing the solvent.

Sufficient effects will be displayed in the case that the above composition is a composition consisting of the fluorine-containing polyether represented by formula (1) alone. It is also possible to blend it with a polymer represented by formula (2), or a polymer represented by formula (6), or a polymer represented by formula (2) and a polymer represented by formula (6) so as to optimize the function as a lubricant. If a polymer represented by formula (2) is added then the flowability can be increased, and if a polymer represented by formula (6) is added then the substrate adhesion can be increased.

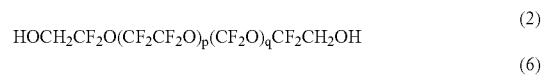

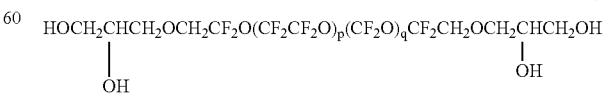

Regarding the proportions in this case, the ratio of the number of mols C of the fluorine-containing polyether represented by formula (1) to the sum of the number of mols C of the fluorine-containing polyether represented by formula (1) and the number of mols D of the polymer represented by formula (2) is preferably not less than 10% (i.e. preferably (C/(C+D))×100≧10). If this ratio is less than 10%, then problems may arise due to the polymer represented by formula (2) flying off.

Furthermore, the ratio of C to the sum of C and the number of mols E of the polymer represented by formula (6) is preferably not less than 10% (i.e. preferably (C/(C+E))×100≧10). If this ratio is less than 10%, then the flowability of the composition may be insufficient. It is more preferable for the ratio of C to the sum of C and E to be not less than 60%.

Furthermore, the ratio of C to the sum of C, D and E is preferably not less than 10% (i.e. preferably (C/(C+D+E))×100≧10). If this ratio is less than 10%, then the effects of the present invention may become hard to obtain.

It has been found that a composition with a good balance between the substrate adhesion and the flowability as a lubricant can be produced by reacting together a polymer represented by formula (2) and glycidol (2,3-epoxy-1-propanol) represented by formula (5). It is thought this is probably because a mixed composition comprising a fluorine-containing polyether represented by formula (1) is obtained as the reaction product, although other factors may be included.

(5)

In the case of using this composition as a lubricant, the composition may be used as a mixture, or may be used after purifying to increase the content of the fluorine-containing polyether represented by formula (1). It is understood from this that it is preferable for the present composition to comprise a fluorine-containing polyether represented by formula (1).

For the present composition, again it is more preferable for the number average molecular weight of the composition to be in a range of 500 to 5,000, and for the ratio A:B of the number of mols A of the terminal group represented by formula (3) to the number of mols B of the terminal group represented by formula (4) in the composition as measured by $^{19}$F NMR to be in a range of 10:90 to 95:5. If the number average molecular weight is less than 500, then in the case, for example, of applying onto a magnetic disk, the amount that flies off upon rotating at high speed will be prone to increasing. If the number average molecular weight exceeds 5,000, then the flowability as a lubricant will be prone to being insufficient. Note that the method of determining the number average molecular weight for the present composition is the same as that indicated for the composition comprising a fluorine-containing polyether represented by formula (1) described earlier.

The reason that it is preferable for the ratio A:B of the number of mols A of the terminal group represented by formula (3) to the number of mols B of the terminal group represented by formula (4) to be in a range of 10:90 to 95:5 is that if A is too high then, although the substrate adhesion will be high, the flowability as a lubricant will be prone to being insufficient, whereas if B is too high then, although the flowability as a lubricant will be high, the substrate adhesion will be prone to being insufficient.

Furthermore, just as for the composition comprising a fluorine-containing polyether represented by formula (1) described earlier, it is preferable for this composition to comprise a polymer represented by formula (2) and/or a polymer represented by formula (6); in the case that the composition comprises such a polymer or polymers, it is preferable for the ratio of C to the sum of C and D in the composition to be not less than 10%, for the ratio of C to the sum of C and E to be not less than 10%, particularly preferably not less than 60%, and for the ratio of C to the sum of C, D and E to be not less than 10%.

The above compositions can be preferably used as a lubricant for a magnetic recording medium comprising a magnetic layer, a protective layer on the magnetic layer, and a magnetic recording medium lubricant layer on the protective layer, in order to form the magnetic recording medium lubricant layer.

Similarly, the above compositions can be preferably used as a lubricant for a head slider equipped with a magnetic recording transducer for carrying out at least one of recording and reproduction of information on a magnetic recording medium, and having a head slider lubricant layer on a head slider surface facing the magnetic recording medium, in order to form the head slider lubricant layer.

For these lubricant layers, it is particularly preferable to carry out at least one of active energy ray treatment and heating treatment after the application of the composition, thus increasing the adhesion to the protective layer or the head slider surface facing the magnetic recording medium (i.e. the substrate adhesion) Regarding the active energy ray treatment and heating treatment, in the case that both are used, both may be carried out simultaneously, or one may be carried out first with the other being carried out afterward. Furthermore, active energy ray treatment and/or heating treatment may be carried out a plurality of times. An example of the active energy rays is ultraviolet rays. There are no particular limitations to the range of the heating temperature in the heating treatment, but a range of 80 to 200° C. is preferable in terms of bonding efficiency and thermal stability.

Note that after the treatment with active energy rays and/or heat, a cross-linked structure or the like may arise, and hence the polymers according to the present invention may be modified; a composition in such a state also comes under the category of the present invention. That is, even if the polymers according to the present invention are not present in an isolated state in the composition after the treatment with active energy rays and/or heat has been carried out, if it can be judged that these polymers were present in the composition before the treatment with active energy rays and/or heat was carried out, then the composition after the treatment with active energy rays and/or heat has been carried out is also a composition according to the present invention.

With a magnetic recording device having a magnetic recording medium and/or head slider using a composition obtained as described above as a lubricant, problems such as head crashes can be prevented or greatly reduced over a prolonged period.

EXAMPLES

Next, examples of the present invention and comparative examples will be described in detail.

Example 1

(Synthesis of Composition)

100 g of commercially sold FOMBLIN Z DOL and 0.1 mol of glycidol were added to 450 mL of tertiary butyl alcohol, and while stirring, a solution of 11.6 g of potassium tertiary butoxide dissolved in tertiary butyl alcohol was added dropwise at room temperature over 30 minutes, and then stirring was carried out for 4 hours at room temperature.

After that, the tertiary butyl alcohol was evaporated off using an evaporator, 400 mL of water and 10 mL of trifluoroacetic acid were added to the residue, and stirring was carried out at room temperature for 10 minutes. Washing was carried out with pure water twice to remove insoluble components, and then the water was evaporated off using an evaporator, thus giving a desired composition.

According to analysis by $^{19}$F NMR, the number average molecular weight was 1,960, the proportion of the number of the terminal group represented by formula (3) to the total number of terminal groups (herein after the proportion of the number of a terminal group to the total number of terminal groups will be referred to as the 'terminal group substitution rate') was 35.7 mol %, and the terminal group substitution rate for the terminal group represented by formula (4) was 62.7 mol %.

Figure 1:
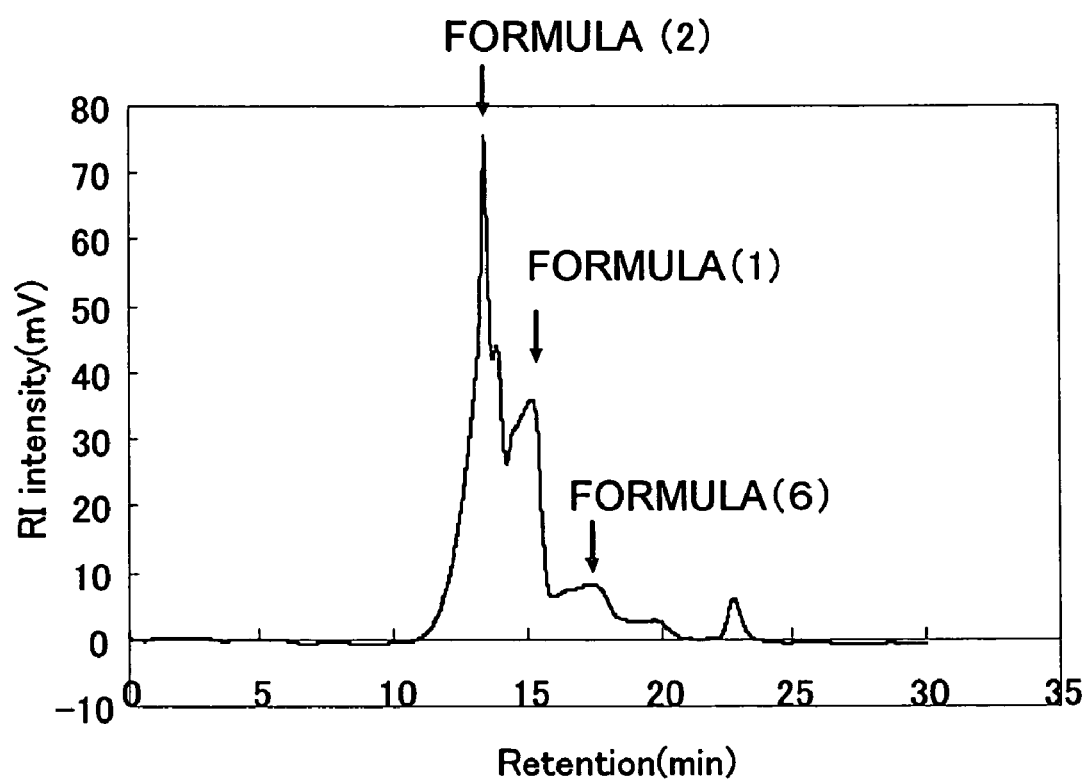
FIG. 1 is a graph showing HPLC analysis results.

Analysis was carried out by high performance liquid chromatography (HPLC), whereupon it was found that, as shown in FIG. 1, the composition comprised a fluorine-containing polyether represented by formula (1) a polymer represented by formula (2), and a polymer represented by formula (6), with the ratio of the numbers of mols of C, D and E being 43.1:42.5:14.4.

Example 2

(Purification of Composition)

The composition obtained in Example 1 was subjected to extraction with a carbon dioxide supercritical fluid, and thus fractionated into six components. For each of the fractions, $^{19}$F NMR analysis was carried out, and the number average molecular weight (Mn), the terminal group substitution rate for the terminal group represented by formula (3) (ROE3), and the terminal group substitution rate for the terminal group represented by formula (4) (ROE4) were determined. The results are shown in the following table.

TABLE 1

| Fraction | Mn | ROE3, mol % | ROE4, mol % |
|---|---|---|---|
| 1 | 1,240 | 12.4 | 82.8 |
| 2 | 1,440 | 17.1 | 80.6 |
| 3 | 1,850 | 28.4 | 70.2 |
| 4 | 2,450 | 42.9 | 56.2 |
| 5 | 2,950 | 56.4 | 42.9 |
| 6 | 2,850 | 68.9 | 30.6 |

Upon carrying out HPLC analysis on the fractions, it was found that the proportion of the fluorine-containing polyether represented by formula (1) was the highest in fraction 4 and fraction 5, and hence it was largely possible to isolate this polymer.

Comparative Example 1

(Preparation of Conventional Lubricant Composition)

A polymer represented by formula (2) (number average molecular weight 2,020) and a polymer represented by formula (6) (number average molecular weight 2,702) were stirred and mixed together well in a molar ratio of 1:1. $^{19}$F NMR analysis was carried out on the resulting lubricant, whereupon it was found that the number average molecular weight was 2,360, the terminal group substitution rate for the terminal group represented by formula (3) was 48.3 mol %, and the terminal group substitution rate for the terminal group represented by formula (4) was 51.1 mol %.

Example 3

(Contact-Start-Stop (CSS) Test)

The composition of Example 1, compositions of Example 2 (fraction 4, fraction 5) and the composition of Comparative Example 1 were applied onto protective layers of hard disks using a dipping method, and a CSS test was carried out to evaluate the HDI (head-disk interface) characteristics. The thickness of applied films of the lubricants was 1.2 nm, and heating treatment was carried out at an ambient temperature of 130° C. for 50 minutes.

CSS was carried out repeatedly at an ambient temperature of 5° C. The result was that with the lubricant layer composed of the composition of Example 1 and the lubricant layers composed of the compositions of Example 2 (fraction 4, fraction 5), faultless operations were possible for more than 50,000 times, which is the standard. It was thus found that, with these examples, desirable film formation ability was realized due to sufficient flowability, and furthermore, good flowability and substrate adhesion as a lubricant were displayed even after prolonged usage.

In contrast with this, for the lubricant layer composed of the composition of Comparative Example 1, head crash occurred after approximately 40,000 times. It is thought that this head crash was due to the flowability of the lubricant being insufficient as a result of the polymer represented by formula (2) flying off.

The film thickness of each lubricant layer was measured using FTIR (Fourier transform infrared spectroscopy), whereupon for the lubricant layer of Comparative Example 1, a reduction of approximately 17% in the film thickness was observed after the test compared with before the test, whereas for the other lubricant layers, only a reduction of less than 5% was observed. It is thus thought that with the lubricant layer composed of the composition of Comparative Example 1, the polymer represented by formula (2) flied off upon rotating at high speed, whereby the reliability in HDI was lost.

Example 4

(Contact-Start-Stop (CSS) Test)

A lubricant represented by formula (2) and fraction 1 from Example 2 were mixed together, thus preparing a lubricant for which (C/(C+D))×100=8 and (C/(C+E))×100=90, and a CSS test was carried out as in Example 3; the result was that head crash occurred after approximately 45,000 times.

Example 5

(Contact-Start-Stop (CSS) Test)

A lubricant for which A:B=87.3:12.7 was subjected to supercritical purification, thus making A:B=96.5:3.5. The resulting lubricant was analyzed by HPLC, whereupon it was found that (C/(C+D))×100=100 and (C/(C+E))×100=7. A CSS test was carried out as in Example 3, and in this case head crash occurred after approximately 45,000 times.

Note that the CSS tests were carried out as follows: a CSS tester was used, and at a radial position of 18.5 mm, the hard disk was accelerated from 0 rpm to 15,000 rpm in 30 seconds, and this rotational speed was maintained for 1 second, and then the hard disk was decelerated from 15,000 rpm to 0 rpm in 30 seconds, and 0 rpm was maintained for 1 second; taking this as one cycle, the cycle was repeated and evaluation was carried out.

What is claimed is:

1. A composition for a magnetic recording medium or head slider for a magnetic recording device, said composition comprising a fluorine-containing polyether represented by formula (1)

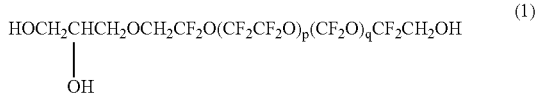
(1)

wherein p and q represent, independently of the symbols in other formulae, any integer greater than zero.

2. The composition according to claim 1, wherein the number average molecular weight of the composition is in a range of 500 to 5,000, and the ratio A:B of the number of mols A of a terminal group represented by formula (3) to the number of mols B of a terminal group represented by formula (4) in the composition as measured by $^{19}F$ NMR is in a range of 10:90 to 95:5

(3)

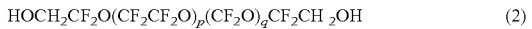
(4)

3. The composition according to claim 1, wherein the composition comprises a polymer represented by formula (2)

$$HOCH_2CF_2O(CF_2CF_2O)_p(CF_2O)_qCF_2CH_2OH \quad (2)$$

wherein p and q represent, independently of the symbols in other formulae, any chosen integers.

4. The composition according to claim 3, wherein the composition comprises a polymer represented by formula (6)

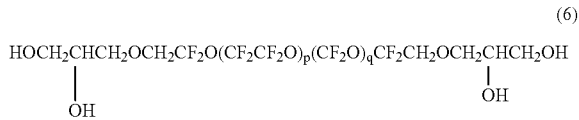
(6)

wherein p and q represent, independently of the symbols in other formulae, any chosen integers.

5. The composition according to claim 3, wherein the ratio of the number of mols C of the fluorine-containing polyether to the sum of the number of mols C of the fluorine-containing polyether and the number of mols D of the polymer represented by formula (2) is not less than 10%.

6. The composition according to claim 4, wherein the ratio of the number of mols C of the fluorine-containing polyether to the sum of the number of mols C of the fluorine-containing polyether and the number of mols E of the polymer represented by formula (6) is not less than 10%.

7. The composition according to claim 6, wherein the ratio of the number of mols C of the fluorine-containing polyether to the sum of the number of mols C of the fluorine-containing polyether and the number of mols E of the polymer represented by formula (6) is not less than 60%.

8. The composition according to claim 4, wherein the ratio of the number of mols C of the fluorine-containing polyether to the sum of the number of mols C of the fluorine-containing polyether, the number of mols D of the polymer represented by formula (2) and the number of mols E of the polymer represented by formula (6) is not less than 10%.

9. A composition obtained by subjecting the composition according to claim 1 to at least one of active energy ray treatment and heating treatment.

* * * * *